United States Patent
Ke (10) Patent No.: US 9,430,053 B2
(45) Date of Patent: Aug. 30, 2016

(54) MULTI-HARDWARE-SYSTEM DATA PROCESSING DEVICE AND INFORMATION INPUT METHOD THEREOF

(75) Inventor: Haibin Ke, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 257 days.

(21) Appl. No.: 13/139,224

(22) PCT Filed: Mar. 26, 2010

(86) PCT No.: PCT/CN2010/071367
§ 371 (c)(1),
(2), (4) Date: Jun. 10, 2011

(87) PCT Pub. No.: WO2010/111932
PCT Pub. Date: Oct. 7, 2010

(65) Prior Publication Data
US 2012/0011296 A1 Jan. 12, 2012

(30) Foreign Application Priority Data
Mar. 31, 2009 (CN) .......................... 2009 1 0080977

(51) Int. Cl.
*G06F 13/12* (2006.01)
*G06F 3/023* (2006.01)

(52) U.S. Cl.
CPC ............ *G06F 3/023* (2013.01); *G09G 2370/20* (2013.01); *G09G 2370/22* (2013.01); *G09G 2370/24* (2013.01)

(58) Field of Classification Search
None
See application file for complete search history.

(56) References Cited

U.S. PATENT DOCUMENTS

2005/0204026 A1* 9/2005 Hoerl ............................ 709/223
2008/0162747 A1 7/2008 Chen et al.
2010/0049890 A1* 2/2010 Best et al. ...................... 710/73

FOREIGN PATENT DOCUMENTS

CN 1658129 A 8/2005
CN 1881174 A 12/2006

OTHER PUBLICATIONS

Lenovo (Beijing) Co., Ltd.; PCT/CN2010/071367 filed Mar. 26, 2010; International Preliminary Report on Patentability; mailed Oct. 13, 2011; International Bureau of WIPO; 6 pages.

(Continued)

*Primary Examiner* — Henry Tsai
*Assistant Examiner* — Dean Phan
(74) *Attorney, Agent, or Firm* — Peter Su; Dentons US LLP (57) ABSTRACT

Provided are a multi-hardware-system data processing device and information input method thereof, the multi-hardware-system data processing device comprising a first hardware system, a second hardware system, a switcher and a shared device; wherein the second hardware system comprises a second control module for generating a message when the second hardware system requires a user to input the information to be inputted, and a second communication module for sending the message to the first hardware system; wherein the first hardware system is connected to the shared device via the switcher and comprises a first communication module for receiving the message, and a first user interaction module for obtaining an input interface to be used by the user to input the information to be inputted according to the message, obtaining the information inputted by the user in the input interface, and sending the inputted information to the second hardware system via the first communication module; the second control module processes the inputted information. By the invention, it is not necessary to conduct switch when the background hardware system needs information to be inputted.

15 Claims, 2 Drawing Sheets

(56) References Cited

OTHER PUBLICATIONS

English Translation of the Abstract in CN1658129A.
English Translation of the Abstract in CN1881174A.
International Search Report for PCT/CN2010/071367, mailed on Jul. 1, 2010.

Chinese Patent Application No. 2009110080977.8, Chinese Patent Office, First Office Action mailed on Jun. 15, 2011; 5 pages.
English Text of Patent Application No. 2009110080977.8, Chinese Patent Office, First Office Action mailed on Jun. 15, 2011; 7 pages.

* cited by examiner

Please input "BIOS password" for "hardware system C":

MULTI-HARDWARE-SYSTEM DATA PROCESSING DEVICE AND INFORMATION INPUT METHOD THEREOF

FIELD OF THE INVENTION

The present invention relates to an electronic field, and in particular to a multi-hardware-system data processing device and an information input method thereof.

DESCRIPTION OF RELATED ART

At present, the technique of hybrid-hardware-system data processing device is improved increasingly. The hybrid-hardware-system data processing device is achieved by embedding and incorporating at least one additional hardware system on the basis of the original hardware system such that a plurality of hardware systems work cooperatively, and the concept of the hardware system comprises the operation system OS and various types of programs executed on the hardware system. These hardware systems share respective devices, such as a keyboard, a mouse, a display and the like (hereinafter referred to as "KVM"), and usually a KVM switcher can be used to switch a shared device to a hardware system for use.

In the process for achieving the present invention, the inventor finds that at least the following problems exist in the art: When a user switches between two hardware systems, it is necessary to switch the KVM switcher in various manners. When the user operates in an operational environment of one hardware system, the KVM is occupied by this hardware system, that is, the KVM is connected to this hardware system via the KVM switcher. At this time, if the user wants to start the other hardware system or the other hardware system automatically runs program(s) in background, when it is necessary to input BIOS password, OS login password, verification code, serial number or other information, and if it is necessary to input several times, the user is forced to frequently switch the KVM to the operational environment of the other hardware system, and switch the KVM back to the operational environment of the hardware system originally used after inputting the related information. Therefore, it is necessary to switch the KVM repeatedly several times before inputting all of the required information, which causes the inconvenience of the user and wastes the switch resource of the system.

SUMMARY OF THE INVENTION

The technical problem to be solved by the present invention is to provide a multi-hardware-system data processing device and an information input method thereof, such that no switching is required when a user operates in one of the hardware systems and another one of the hardware systems requires to input information.

In order to solve the above problem, the present invention provides a multi-hardware-system data processing device including a first hardware system, a second hardware system, a switcher and a shared device, wherein the second hardware system comprises a second control module for generating a message when the second hardware system requires a user to input the information to be inputted; and a second communication module for sending the message to the first hardware system, wherein the first hardware system is connected to the shared device via the switcher and comprises a first communication module for receiving the message; and a first user interaction module for obtaining an input interface to be used by the user to input the information to be inputted according to the message, obtaining the information inputted by the user in the input interface, and sending the inputted information to the second hardware system via the first communication module, wherein the second hardware system receives the inputted information via the second communication module and the second control module processes the inputted information.

In addition, the second hardware system further includes a second user interaction module for generating the input interface, and the message sent by the second communication module includes the input interface; and the first user interaction module includes a display module for displaying the input interface on the display screen of the shared device.

In addition, the message includes request information for requesting the first hardware system to generate the input interface; and the first user interaction module includes a generating module for generating the input interface according to the request information and a display module for displaying the input interface on the display screen of the shared device.

In addition, the message includes type information for the information to be inputted; the first hardware system further includes a first control module for receiving the message from the first communication module, parsing the message, and confirming the type of the information to be inputted; and the first user interaction module prompts the user to input the information to be inputted of the corresponding type in the input interface according to the type of the information to be inputted.

In addition, the second control module further includes a determining module for, when the multi-hardware-system data processing device includes three or more than three hardware systems, determining a hardware system among the three or more than three hardware systems being connected to the shared device as the first hardware system by inquiring the connection state of each of the three or more than three hardware systems with the shared device; and an identifying module for adding a hardware system identification of the second hardware system into the message, wherein the first user interaction module prompts the user to input the information to be inputted of the corresponding hardware system in the input interface according to the hardware system identification included in the message.

The present invention further provides an information input method of multi-hardware-system applied to a data processing device comprising a first hardware system, a second hardware system, a switcher and a shared device, when the first hardware system occupies the shared device via the switcher, the method comprises the steps of sending a message to the first hardware system when the second hardware system requires a user to input the information to be inputted; the first hardware system obtaining an input interface according to the message after receiving the message, and the user inputting the information to be inputted by using the input interface; the first hardware system obtaining the information inputted by the user in the input interface, and sending the inputted information to the second hardware system; and the second hardware system receiving and processing the inputted information.

In addition, before the second hardware system sending a message to the first hardware system, the method further includes the step of generating the input interface, wherein the message sent by the second hardware system includes the input interface; and the first hardware system obtaining an input interface according to the message refers to the first hardware system displaying the input interface on the display screen of the shared device.

In addition, the message includes the requested information as an indication for requesting the first hardware system to generate the input interface; and the first hardware system obtaining an input interface according to the message refers to the first hardware system generating the input interface according to the request information and displaying the input interface on the display screen of the shared device.

In addition, the message includes type information for the information to be inputted; after the first hardware system receiving the message and before the first hardware system generating the input interface, the method further includes parsing the message, and confirming the type of the information to be inputted; and the first hardware system prompts the user to input the information to be inputted of the corresponding type in the input interface when generating the input interface.

In addition, when the multi-hardware-system data processing device includes three or more than three hardware systems, the second hardware system determines a hardware system among the three or more than three hardware systems being connected to the shared device via the switcher as the first hardware system by inquiring the connection state of each of the three or more than three hardware systems with the shared device; the second hardware system adds a hardware system identification of the second hardware system into the message; and the first user interaction module prompts the user to input the information to be inputted of the corresponding hardware system in the input interface according to the hardware system identification indicated in the message when generating the input interface.

The present invention further provides a multi-hardware-system data processing system including a first hardware system, a second hardware system, a switcher and a shared device, wherein the second hardware system comprises a second control module for generating a message when the second hardware system requires a user to input the information to be inputted, and a second communication module for sending the message to the first hardware system, wherein the first hardware system is connected to the shared device via the switcher and comprises a first communication module for receiving the message, a first user interaction module for obtaining an input interface to be used by the user to input the information to be inputted according to the message, obtaining the information inputted by the user in the input interface, and sending the inputted information to the second hardware system via the first communication module; and wherein the second hardware system receives the inputted information via the second communication module and the second control module processes the inputted information.

One embodiment of the present invention at least has the following technical effects. No switching is required when a hardware system requires a user inputs the information to be inputted while another hardware system occupies the shared device. The present invention illustrates two implementing solutions by two embodiments respectively, such that an input interface can be generated in the background or foreground according to different conditions in a particular application. Another embodiment of the present invention lists various conditions requiring a user to input the information to be inputted, and at least has the following technical effect. The first effect covers the conditions when the hardware system is started and executed in the background, and the second effect is capable of automatically continuing to require the user to input the verification information without switching when the verification information produces an error while the hardware system is starting or executing in the background. On the basis of the above, the present invention further proposes that the hardware system occupying the shared device prompts the user to do the corresponding input according to the type of the information to be inputted in still another embodiment, and at least has the following technical effects. When various information to be inputted are required, the solution may have a broader applicable scope by distinguishing the type of the information to be inputted, and inputting without switching may be achieved no matter what kind of information is required to be inputted by the hardware system in the background. Still another embodiment of the present invention proposes a hardware system prompting a user that a password is needed to be inputted, and at least has the following technical effects. When there are a plurality of hardware systems, a user can distinguish which hardware system the password to be inputted belongs to, so as to avoid to input an erroneous information to be inputted as well as enhancing the reliability.

DETAILED DESCRIPTION OF THE INVENTION

The technical solution of the embodiments of the present invention will be described below in more detail with reference to the drawing.

Figure 1:
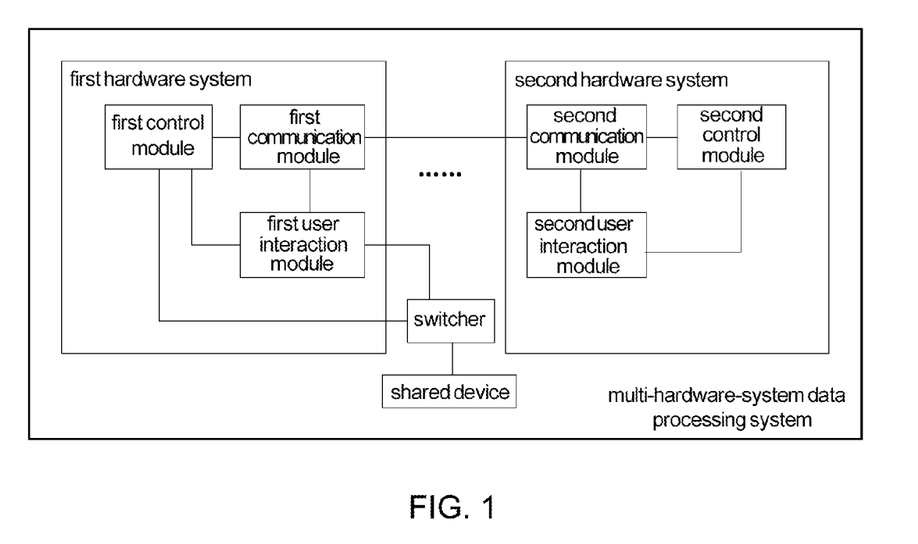
FIG. 1 is a schematic block diagram of a multi-hardware-system data processing device in the first embodiment.

As shown in FIG. 1, a multi-hardware-system data processing device includes a first hardware system, a second hardware system, a switcher and a shared device, wherein the second hardware system comprises a second control module for generating a message when the second hardware system requires a user to input the information to be inputted; and a second communication module for sending the message to the first hardware system, the first hardware system is connected to the shared device via the switcher, and comprises a first communication module for receiving the message; and a first user interaction module for obtaining an input interface to be used by the user to input the information according to the message, obtaining the information inputted by the user in the input interface, and sending the inputted information to the second hardware system via the first communication module, the second hardware system receives the inputted information via the second communication module, and the second control module processes the inputted information.

In the present embodiment, the second hardware system is a hardware system which requires the user to input the information and is not connected to the shared device.

In an implementation of the present embodiment, the second hardware system may further include a second user interaction module, and the second user interaction module will generate the input interface when the second hardware system requires the user to input the information to be inputted, but cannot display the input interface to the user on the display screen via the display of the shared device since the second hardware system does not occupy the display; and the user cannot input in the second hardware system via the keyboard or mouse in the shared device.

The message sent by the second communication module includes the input interface; and the second user interaction module can send the input interface to the second communication module by itself, or send the input interface to the second control module which then includes the input interface into the generated message.

The first user interaction module includes a display module for displaying the input interface on the display screen of the shared device.

This implementation can be achieved by but not limited to the technique for redirecting screen.

In another implementation of the present embodiment, the message includes request information for requesting the first hardware system to generate the input interface.

The first user interaction module includes a generating module for generating the input interface according to the request information; and a display module for displaying the input interface on the display screen of the shared device.

These two implementations can be mixed to use, for example adopting an implementation for some kinds of information to be inputted and another implementation for other kinds of information to be inputted. The second control module judges whether the second user interaction module needs to generate the input interface and whether the input interface needs to be included in the message, according to what kind of information to be inputted being required by the second hardware system.

In the present embodiment, the information to be inputted includes verification information, selection information, acknowledge information and the like; and other information needed to be inputted by the user also can be included in a real application. The verification information is information used by a hardware system for judging the right of the user, and includes one or more of the following: BIOS password, OS login password, network login password, serial number, program login password, authorization code, registration number and the like. When the hardware system gives several options to the user and requires the user to select one among the several options, the user needs to input selection information representing which option is selected by the user. The user can input the selection information by clicking the mouse, and also by using the keyboard. For example, "update now" and "remind later" are given for being selected by the user when a program needs to be updated, and for another example, "restart now" and "restart later" are given for being selected by the user after a program is installed, and the user selects certain option by clicking the mouse or using the keyboard at this time. The acknowledge information is information for responding to an instant message sent from another person in an interaction program such as a chart program, an interaction game and the like.

For example, in the case of the second hardware system being started, when requiring the user to input verification information such as BIOS password, OS login password and the like during the starting process, the second hardware system generates the message to send to the first hardware system, and the first hardware system prompts the user to input the corresponding password, and sends the password inputted by the user to the second hardware system after obtaining the same. Alternatively, when it is necessary for the user to select one from several options during the starting process, for example, it is necessary for the user to select one from several user names when logging in OS, the second hardware system generates the message to send to the first hardware system, and the first hardware system prompts the user to select an option, and sends the selection of the user to the second hardware system after obtaining the same.

Still for example, in the case that long time is required for a program such as "office" to be installed in the second hardware system and the user switches the shared device to the first hardware system via the switcher at this time, when a serial number is needed to be inputted during the executing process of the office installer in the second hardware system, the second hardware system generates the message and sends it to the first hardware system, the first hardware system prompts the user to input a serial number and sends the serial number inputted by the user to the second hardware system after obtaining the same. When it is necessary for the user to select one from several options, for example three options including "previous", "next" and "cancel", during the executing process of the office installer in the second hardware system, the second hardware system generates the message and send it to the first hardware system, the first hardware system prompts the user to select an option and sends the selection of the user to the second hardware system after obtaining the same.

Still for example, in the case that chat programs such as QQ, MSN and the like are installed in the second hardware system and the user switches the shared device to the first hardware system via the switcher for working after running QQ in the second hardware system, if another person sends an instant message to the user via QQ at this time, the second hardware system generates the message and sends it to the first hardware system, the first hardware system prompts the user to input a response and sends the response inputted by the user to the second hardware system after obtaining the same.

In the present embodiment, the manner used by the second control module for processing the inputted information can be identical to that used when the information inputted by the user is received in the present hardware system, that is, handing over the same to a program or procedure requiring the user to input verification information for the corresponding processing. For example, the processing to the verification information is making verification to get a verification result representing whether the verification information is correct or wrong; in the case that the verification result represents the verification information is correct, the second control module proceeds to the next step in the starting process or the executing process; with respect to the selection information, the subsequent step is done according to the selected option; and with respect to the acknowledge information, a reply is made via an interaction program.

In the present embodiment, the cases that the second hardware system requires the user to input the verification information include one or more of the following cases: during the starting process, the next step can be performed only when correct verification information is inputted by the user; during the process of executing program, the next step can be performed only when correct verification information is inputted by the user; and the verification result represents that the verification information is wrong.

In an implementation of the present embodiment, in the case that the verification result represents that the verification information is wrong, the second control module can further judge whether the times of the verification information being wrong exceeds the permitted maximum times, and the verification is done continuously only when the times of the verification information being wrong does not exceed the permitted maximum times, otherwise the starting process or the process of executing the program is abandoned directly.

In the present embodiment, the second hardware system requires the user to input the selection information in the following case. The second hardware system requires the user to select one from several options during the starting process or during the process of executing a program.

In the present embodiment, the second hardware system requires the user to input the acknowledge information in the following case. The second hardware system receives instant information sent from another person to the user.

In the present embodiment, when the message includes request information, the second control module includes type information of the information to be inputted into the message according to the condition for the information to be inputted by the user. The type information can be for example a BIOS password, an OS login password, a QQ login password, an installation serial number, a chat message, a step selection and the like.

In addition, the first hardware system further includes a first control module for receiving the message from the first communication module, parsing the message, and confirming the type of the information to be inputted; and the first user interaction module prompts the user to input the information to be inputted of the corresponding type in the generated input interface according to the type of the information to be inputted.

The type of the information to be inputted includes one or more of the following types: a BIOS password, an OS login password, a network login password, a serial number, a program login password, an authentication code, a registration number, a selection to the options in certain program, a response in certain interaction program and the like.

For some commonly used types of information to be inputted, such as a BIOS password, an OS login password and the like, the first hardware system and the second hardware system can specify the codes for representing these types of information to be inputted, such as numerical values or characters, and then the second control module only needs to carry the corresponding code in the message; the first control module parses the message to determine the code, and then the first user interaction module prompts the user to input the information to be inputted of the corresponding type in the generated input interface according to the code.

However, if what is displayed by the first user interaction module is the input interface generated by the second user interaction module, the input interface can directly prompt the user to input what kind of information, display options in the case that information to be inputted is a selection information and display the message sent from another person in the case that information to be inputted is a response information.

In an implementation of the present embodiment, the multi-hardware-system data processing device includes three or more than three hardware systems. Therefore the second control module further needs to determine which one of the other hardware systems is the first hardware system when the second hardware system requires the user to input information to be inputted.

In the present implementation, the second control module further includes a determining module for, when the multi-hardware-system data processing device includes three or more than three hardware systems, determining a hardware system among the three or more than three hardware systems being connected to the shared device as the first hardware system by inquiring the connection state of each of the three or more than three hardware systems with the shared device.

For example, each hardware system can set a flag bit to indicate whether the present hardware system is connected to the shared device at present, and the determining module inquires the connection state of each of other hardware systems with the shared device by inquiring the flag bit of the respective hardware system. Alternatively, the determining module sends an inquiring message to each of other hardware systems via the second communication module. Each of other hardware systems or only the first hardware system feedbacks the connection state of the respective hardware system with the shared device, such that the determining module can determine the first hardware system. Alternatively, the determining module also can determine the first hardware system by inquiring which hardware system is connected to the shared device by the switcher.

In addition, the data processing device can further include a memory accessible by all of the hardware systems for storing the connection information of the shared device. When a hardware system begins to be connected to the shared device, or when the switcher connects the shared device to a hardware system, the hardware system or the switcher updates the connection information, and the determining module determines the first hardware system by directly inquiring the connection information. The memory can reside in but not limited to the switcher.

In a specific application, it is still possible for the determining module to adopt other manners to determine which hardware system is the first hardware system.

In the present embodiment, the second control module can further include an identifying module for adding a hardware system ID (identification) of the second hardware system into the message.

In this case, the first user interaction module can prompt the user to input the information to be inputted of the corresponding hardware system in the input interface according to the hardware system ID included in the message. If respective hardware systems use different operation systems, the first user interaction module can further prompt the user to input the information to be inputted of the operation system used by the corresponding hardware system while prompting the user to input the information to be inputted of the corresponding hardware system. For example, when the second hardware system uses XP operation system, the first user interaction module can prompt the user to input the information to be inputted of the XP operation system in the input interface, such that the prompt information seen by the user will be intuitive since the user may be more familiar with the "operation system" as compared with the "hardware system".

The second control module can directly carry the hardware system ID in the message, or can uses the numerical value or character specified by the respective hardware systems to represent the hardware system ID.

In another implementation of the present embodiment, the multi-hardware-system data processing device only includes a first hardware system and a second hardware system. In this case, the multi-hardware-system data processing device can operate according to the above implementation or the implementation as follows. The second control module can directly determine the other hardware system as the first hardware system and does not need to indicate the hardware system ID of the present hardware system in the generated message.

Accordingly, the first user interaction module only needs to prompt the user to input the information to be inputted of the other hardware system in the input interface.

In this implementation, the second control module can inquire whether the other hardware system is connected to the shared device, and determine the other hardware system as the first hardware system only when the same is connected to the shared device. In this case, if the other hardware system fails to be connected to the shared device, the shared device can be switched to the hardware system which requires the user to input verification information.

In the present embodiment, the data processing device may be any one of the following devices: a desktop computer, a notebook computer, a PDA, an embedded device, a hand-held terminal and the like.

In the present embodiment, the shared device may include one or more of the following devices: a display screen, a keyboard, a mouse, a hard disk, and other peripherals.

In a second embodiment, an information input method of a multi-hardware-system applied to a data processing device comprises a first hardware system, a second hardware system, a switcher and a shared device, when the first hardware system is connected to the shared device via the switcher, the method comprises the steps of sending a message to the first hardware system when the second hardware system requires a user to input the information to be inputted; the first hardware system obtaining an input interface according to the message after receiving the message, and the user inputting the information to be inputted by using the input interface; the first hardware system obtaining the information inputted by the user in the input interface, and sending the inputted information to the second hardware system; and the second hardware system receiving and processing the inputted information.

In the present embodiment, a hardware system requiring the user to input the information to be inputted and not being connected to the shared device is the second hardware system.

In an implementation of the present embodiment, before the second hardware system sends a message to the first hardware system, the method further includes the step of generating the input interface. However, the input interface can not be displayed to the user on the display screen by the display of the shared device since the second hardware system does not occupy the display.

In addition, the message sent by the second hardware system includes the input interface.

In this case, the first hardware system obtaining an input interface according to the message refers to the first hardware system displaying the input interface on the display screen of the shared device.

This implementation can be achieved by but not limited to the technique for redirecting screen.

In another implementation of the present embodiment, the message includes request information for requesting the first hardware system to generate the input interface. In this case, the first hardware system obtaining an input interface according to the message refers to the first hardware system generating the input interface according to the request information and displaying the input interface on the display screen of the shared device.

These two implementations can be used in combination (or as a mix implementation of the two), for example adopting an implementation for some kinds of information to be inputted such as a BIOS password, an OS login password and the like, and another implementation for other kinds of information to be inputted such as a serial number, a selection information, a QQ response information and the like.

In the present embodiment, the information to be inputted includes verification information, selection information, acknowledge information and the like; and other information needed to be inputted by the user also can be included in a special application. The verification information therein is information used by a hardware system for judging the right of a user, and includes one or more of the followings: a BIOS password, an OS login password, a network login password, a serial number, a program login password, an authentication code, a registration number and the like. When the hardware system gives several options for the user and requires the user to select one among the several options, selection information is needed to be inputted by the user and is information representing which option is selected by the user. The selection information can be inputted by clicking the mouse, and also can be inputted by using the keyboard. For example, "update now" and "remind later" are given for being selected by the user when a program needs to be updated, and still for example, "restart now" and "restart later" are given for being selected by the user after a program is installed, and the user selects certain option by clicking the mouse or using the keyboard at this time. The acknowledge information is information for responding to an instant message sent from another person in an interaction program such as a chart program, an interaction game and the like.

For example, in the case that the second hardware system is started, when the user is required to input verification information such as BIOS password, OS login password and the like during the starting process, the second hardware system generates the message and send it to the first hardware system, the first hardware system prompts the user to input the corresponding password, and sends the password inputted by the user to the second hardware system after obtaining the same. When it is necessary for a user to select one from several options during the starting process, for example, it is necessary for a user to select one from several user names when logging in OS, the second hardware system generates the message and send it to the first hardware system, the first hardware system prompts the user to select an option, and sends the selection of the user to the second hardware system after obtaining the same.

Still for example, in the case that long time is required for a program such as "office" to be installed in the second hardware system and the user switches the shared device to the first hardware system via the switcher at this time, when a serial number is needed to be inputted during the executing process of the office installer in the second hardware system, the second hardware system generates the message and send it to the first hardware system, and the first hardware system prompts the user to input the serial number and sends the serial number inputted by the user to the second hardware system after obtaining the same. When it is necessary for the user to select one from several options, for example three options including "previous", "next" and "cancel", during the executing process of the office installer in the second hardware system, the second hardware system generates the message to send to the first hardware system, and the first hardware system prompts the user to select an option and sends the selection of the user to the second hardware system after obtaining the same.

Still for example, in the case that chat programs such as QQ, MSN and the like are installed in the second hardware system and the user switches the shared device to the first hardware system via the switcher for working after running QQ in the second hardware system, if another person sends an instant message to the user via QQ at this time, the second hardware system generates the message and send it to the first hardware system, the first hardware system prompts the user to input a response and sends the response inputted by the user to the second hardware system after obtaining the same.

In the present embodiment, the manner used by the second hardware system for processing the inputted information can be identical to that used when the information inputted by the user is received in the present hardware system. For example, the processing to the verification information is making verification to get a verification result representing whether the verification information is correct or wrong; in the case that the verification result represents the verification information is correct, the second control module proceeds the next step in the starting process or the executing process; with respect to the selection information, the subsequent step is done according to the selected option; and with respect to the acknowledge information, a reply is made via an interaction program.

In the present embodiment, the cases that the second hardware system requires the user to input the verification information include one or more of the following cases during the starting process, the next step can be performed only when correct verification information is inputted by the user; during the process of executing program, the next step can be performed only when correct verification information is inputted by the user; and the verification result represents that the verification information is wrong.

In an implementation of the present embodiment, in the case that the verification result represents that the verification information is wrong, the second hardware system can further judge whether the times of the verification information being wrong exceeds the permitted maximum times, and the verification is done continuously only when the times of the verification information being wrong does not exceed the permitted maximum times, otherwise the starting process or the process of executing the program is abandoned directly.

In the present embodiment, the second hardware system requires the user to input the selection information in the following case. The second hardware system requires the user to select one from several options during the starting process or during the process of executing a program.

In the present embodiment, the second hardware system requires the user to input the acknowledge information in the following case. The second hardware system receives instant information sent from another person to the user.

In the present embodiment, when the message includes request information, the second hardware system includes type information of the information to be inputted into the message according to the condition for the information to be inputted by the user, the type information can be for example a BIOS password, a OS login password, a QQ login password, an installation serial number, a chat message, a step selection and the like.

In addition, after the first hardware system receives the message and before the first hardware system generates the input interface, the method further includes parsing the message and confirming the type of the information to be inputted.

In this case, the first hardware system prompts the user to input the information to be inputted of the corresponding type in the input interface when generating the input interface.

The type of the information to be inputted includes one or more of the following types: a BIOS password, an OS login password, a network login password, a serial number, a program login password, an authentication code, a registration number, a selection to the options in certain program, a response in certain interaction program and the like.

For some commonly used types of information to be inputted, such as a BIOS password, an OS login password and the like, the first hardware system and the second hardware system can specify the codes for representing these types of information to be inputted, such as numerical values or characters, and then the second hardware system only needs to carry the corresponding code in the message; the first hardware system parses the message to determine the code, and then the first hardware system prompts the user to input the information to be inputted of the corresponding type in the generated input interface according to the code.

However, if what is displayed by the first hardware system is the input interface generated by the second hardware system, the input interface can directly prompt the user to input what kind of information, display options in the case that information to be inputted is selection information and displays the message sent from another person will be displayed in the case that information to be inputted is a response information.

In an implementation of the present embodiment, the multi-hardware-system data processing device includes three or more than three hardware systems. Therefore the second hardware system further needs to determine which one of the other hardware systems is the first hardware system when the second hardware system requires the user to input information to be inputted.

The second hardware system can determine a hardware system among the three or more than three hardware systems being connected to the shared device as the first hardware system by inquiring the connection state of each of the three or more than three hardware systems with the shared device. For example, each hardware system can set a flag bit to indicate whether the present hardware system is connected to the shared device at present, and the second hardware system inquires the connection state of each of other hardware systems with the shared device by inquiring the flag bit of the respective hardware system. Alternatively, the determining module sends an inquiring message to each of other hardware systems. Each of other hardware systems or only the first hardware system feedbacks the connection state of the respective hardware system with the shared device, such that the second hardware system can determine the first hardware system. Alternatively, the second hardware system also can determine the first hardware system by inquiring which hardware system is connected to the shared device by the switcher.

In addition, the data processing device can further include a memory accessible by all of the hardware systems for storing the connection information of the shared device. When a hardware system begins to be connected to the shared device, or when the switcher connects the shared device to a hardware system, the hardware system or the switcher updates the connection information, and the second hardware system determines the first hardware system by directly inquiring the connection information. The memory can reside in but not limited to the switcher.

In a specific application, it is still possible for the second hardware system to adopt other manners to determine which hardware system is the first hardware system.

In the present embodiment, the second hardware system can further add a hardware system ID (identification) of the second hardware system into the generated message.

The first hardware system prompts the user to input the information to be inputted of the corresponding hardware system in the input interface according to the hardware system ID indicated in the message when generating the input interface. If respective hardware systems use different operation systems, the first hardware system can further prompt the user to input the information to be inputted of the operation system used by the corresponding hardware system while prompting the user to input the information to be inputted of the corresponding hardware system. For example, when the second hardware system uses XP operation system, the first hardware system can prompt the user to input the information to be inputted of the XP operation system in the input interface, such that the prompt information seen by the user will be intuitive since the user may be more familiar with the "operation system" as compared with the "hardware system".

The second hardware system can directly carry the hardware system ID in the message, or can uses the numerical value or character specified by the respective hardware systems to represent the hardware system ID.

In another implementation of the present embodiment, the multi-hardware-system data processing device only includes a first hardware system and a second hardware system. In this case, the multi-hardware-system data processing device can operate according to the above implementation or the implementation as follows: the second hardware system can directly determine the other hardware system as the first hardware system and does not need to indicate the hardware system ID of the present hardware system in the generated message.

The first hardware system only needs to prompt the user to input the information to be inputted of the other hardware system in the input interface.

In this implementation, the second hardware system can inquire whether the other hardware system is connected to the shared device, and determine the other hardware system as the first hardware system only when the same is connected to the shared device. In this case, if the other hardware system fails to be connected to the shared device, the shared device can be switched to the hardware system which requires the user to input verification information.

In the present embodiment, the data processing device may be any one of the following devices: a desktop computer, a notebook computer, a PDA, an embedded device, a hand-held terminal and the like.

In the present embodiment, the shared device may include one or more of the following devices: a display screen, a keyboard, a mouse, a hard disk, and other peripherals.

Figure 2:
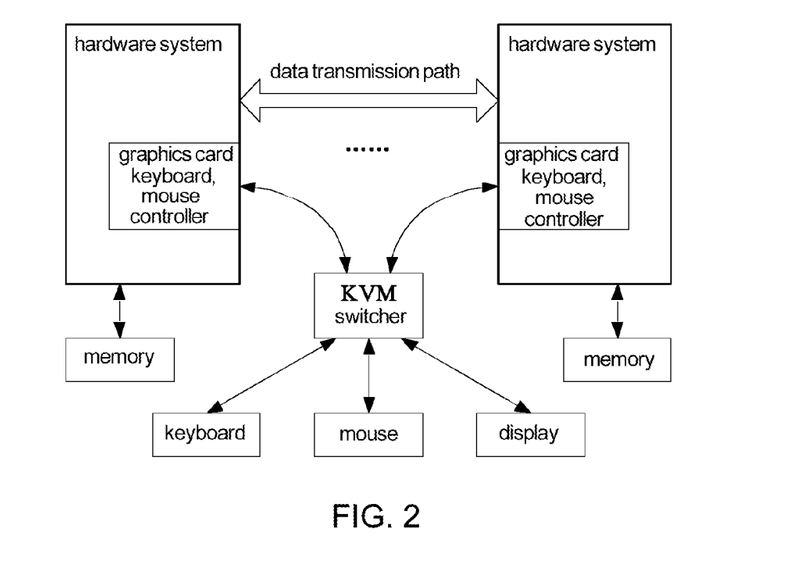
FIG. 2 is a systematic configuration diagram of the third embodiment.

In a third embodiment, a starting process of a hardware system in a multi-hardware-system data processing device as shown in FIG. 2 includes at least two hardware systems, memories corresponding to the respective hardware systems respectively, a KVM switcher, and a shared device; the shared device includes a keyboard, a mouse, and a display; each of the at least two hardware systems has a graphics card, a keyboard, and a mouse controller being connected to the KVM switcher.

Assuming that the at least two hardware systems include a hardware system A, a hardware system B, and a hardware system C. The description for the starting process of the hardware system C being a second hardware system while the hardware system A being a first hardware system will be given below.

The second hardware system includes a second control module which is a second CPU in the present embodiment, and a second communication module which is a second terminal point of the data transmission path in the multi-hardware-system in the present embodiment. The first hardware system includes a first control module which is a first CPU in the present embodiment; a first communication module which is a first terminal point of the data transmission path in the present embodiment; and a first user interaction module which comprises the graphics card, keyboard, and mouse controller and the part for controlling the graphics card, keyboard, and mouse controller in the first CPU in the present embodiment.

Figure 3:
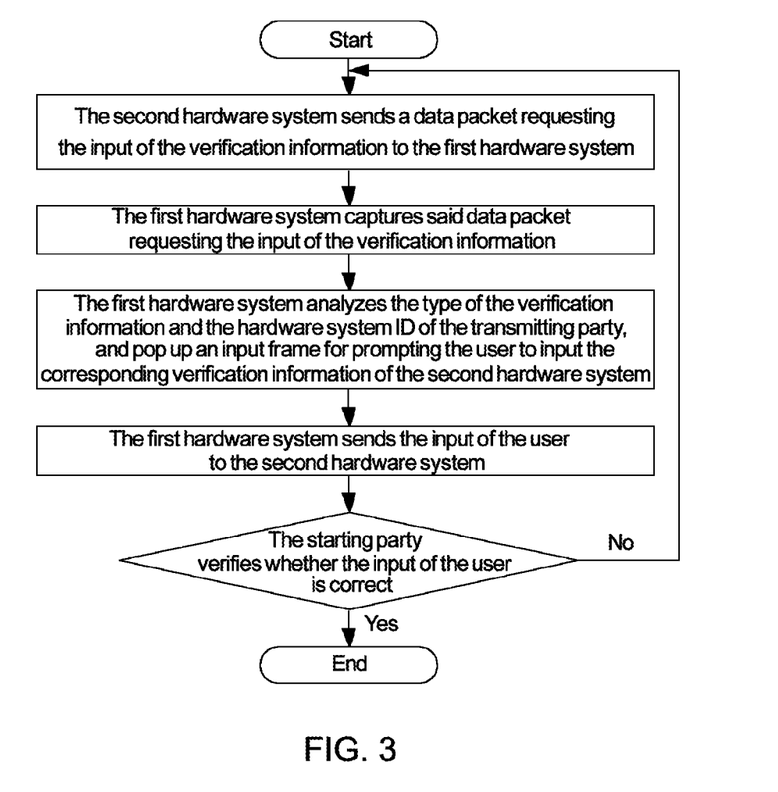
FIG. 3 is a schematic diagram of the starting process in the third embodiment.

The first hardware system starts at first, and the KVM switcher switches the keyboard, mouse, and display to the graphics card, keyboard, and mouse controller in the first hardware system, in other words, the first hardware system is connected to the shared device at this time. The starting process of the second hardware system is shown in FIG. 3, and includes the steps of (1) When the second hardware system requires a user to input the information to be inputted during the starting process, the second CPU in the second hardware system determines the hardware system A as the first hardware system by inquiring the KVM switcher or inquiring the connection state of each of other hardware systems with the shared device; then the second CPU generates a message and sends the same to the first hardware system through the second terminal point of the data transmission path, wherein the information to be inputted is verification information, and the message includes request information which is a data packet requesting the input of the verification information in the present embodiment. The data packet requesting the input of the verification information includes the information of "type of the information to be inputted", such as a BIOS login password, an OS login password, a network login password and the like. In the present embodiment, "type of the information to be inputted" is prescribed as follows.

TABLE 1

Definitions to type of the information to be inputted

| Value of type of the verification information (hexadecimal) | Type of the information to be inputted |
|---|---|
| 0x80 | BIOS login password |
| 0x81 | OS login password |
| 0x82 | network login password |
| . . . | . . . |

In addition, in the present embodiment, the data packet requesting the input of the verification information further includes the information of "hardware system ID" to represent which hardware system sends the data packet requesting the input of the verification information. The "hardware system ID" can also be represented by the predefined numerical value or character as shown in the following table.

TABLE 2

Definition to the respective hardware system ID

| Value of hardware system ID (hexadecimal) | Comments: |
|---|---|
| 0x60 | hardware system ID of hardware system A |
| 0x61 | hardware system ID of hardware system B |
| 0x62 | hardware system ID of hardware system C |
| ... | ... |

Therefore, in the present embodiment, the data in the data packet requesting the input of the verification information can be as shown in Table 3.

| | | |
|---|---|---|
| 0x62 | 0x80 | ... |

Wherein "0x62" represents that the data packet requesting the input of the verification information is sent from the hardware system C, and "0x80" represents that the type of the information needed to be inputted is a BIOS password.

(2) The first CPU in the first hardware system captures the data packet requesting the input of the verification information through the first terminal point of the data transmission path.

Figure 4:
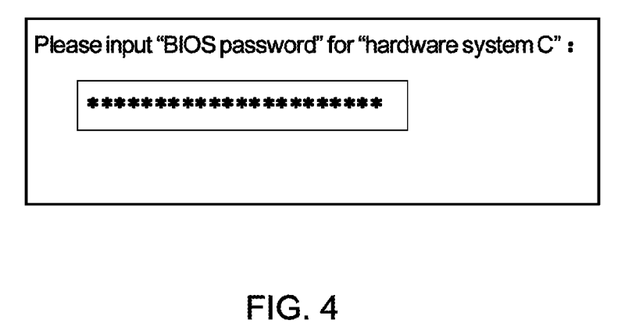
FIG. 4 is a schematic diagram of the input frame in the third embodiment.

(3) The first CPU parses the data packet requesting the input of the verification information, confirms the type of the information to be inputted, generates an input interface, prompts the user to input the verification information of the corresponding type in the input interface, and indicates the graphic card to display the input interface on a display screen by the display. In the present embodiment, a pop-up input frame is used as the input interface, as shown in FIG. 4.

The prompt information "hardware C" and "BIOS password" in the input frame is obtained by analyzing the received data packet requesting the input of the verification information by the first hardware system.

In addition, if respective hardware systems use different operation systems, the prompt information for a hardware system in the input frame can be replaced by the operation system used by the hardware system. For example, when the second hardware system C uses XP operation system, the prompt information may also be "input the BIOS password for XP operation system", such that the prompt information seen by the user will be intuitive.

The input frame is closed after the verification information is inputted by the user through the keyboard in the shared device.

(4) The first CPU obtains the verification information inputted by the user through the keyboard and/or mouse controller, and sends the same to the second hardware system through the first terminal point of the data transmission path.

(5) The second CPU receives the verification information through the second terminal point of the data transmission path. For example, if the verification information is the OS login password, it is handed over to OS for verifying, and if the verification information is correct, the starting process is done successively until the starting process is finished or a further verification information is required to be inputted by the user. When a further verification information is required to be inputted by the user or the verification information is wrong, the method returns back to step (1).

In this way, if it is required to switch back to the first hardware system from the second hardware system, the switching may be done after the second hardware system is started successfully rather than during the starting process of the second hardware system.

In the case that a hardware system has been started successfully and is occupying the shared device, the starting process of any of the other hardware systems can be derived from the above steps (1)-(5).

In another implementation of the present embodiment, the multi-hardware-system data processing device only includes a hardware system A and a hardware system B, wherein the hardware system A is a first hardware system and the hardware system B is a second hardware system. This implementation is similar to that of steps (1)-(5), except that it is possible for the data packet requesting the input of the verification information not to include the hardware system ID, since there are only two hardware systems in total and the hardware system receiving the data packet requesting the input of the verification information may default that the data packet comes from another hardware system. In addition, in step (3), "hardware system C" in the prompt information of the input frame can be amended into "another hardware system" in the present implementation, since there are only two hardware systems in total and the user can exactly know which hardware system "another hardware system" refers to. Certainly, the hardware system can be indicated by the hardware system itself or by the operation system used by the hardware system as shown in the above step (3).

Although it is the first hardware system to generate the input interface in the present embodiment, the second hardware system can be used to generate the input interface. In this case, the second hardware system further includes a second user interaction module for generating the input interface, the message sent by the second communication module includes the input interface, and the second user interaction module may be the part for controlling the graphics card in the second CPU. Then, the first CPU indicates the graphics card to display the input interface on the display screen by the display after receiving the message.

Furthermore, the first hardware system, the second hardware system, the switcher and the shared device in the above embodiments of the present invention are unnecessarily located in a same device. In other words, the present invention can be embodied as a multi-hardware-system data processing system including a first hardware system, a second hardware system, a switcher and a shared device provided physically separately from each other, wherein the second hardware system comprises a second control module for generating a message when the second hardware system requires a user to input the information to be inputted, and a second communication module for sending the message to the first hardware system, and wherein the first hardware system is connected to the shared device via the switcher and comprises a first communication module for receiving the message, a first user interaction module for obtaining an input interface to be used by the user to input the information to be inputted according to the message, obtaining the information inputted by the user in the input interface, and sending the inputted information to the second hardware system via the first communication module; wherein the second hardware system receives the inputted information via the second communication module and the second control module processes the inputted information.

Although the present embodiment is described under the circumstance that a user is required to input the information to be inputted when a hardware system is being started, it is similar to the other circumstances wherein a user is required to input the information to be inputted during the executing process for the hardware system.

Certainly, the present invention has other various embodiments, various corresponding changes and variants can be made by those skilled in the art according to the present invention without departing from the scope and spirit of the present invention, and all of these corresponding changes and variants fall in the protection scope as defined in the claims and equivalents thereof.

What is claimed is:

1. A multi-hardware-system data processing device comprising:
   a first hardware system;
   a second hardware system;
   a switcher;
   a shared device, wherein one of the first hardware system and the second hardware system is switched to be connected to the shared device via the switcher, the second hardware system comprises:
   a second control module for generating a message when the second hardware system requires a user to input the information to be inputted; and
   a second communication module for sending the message to the first hardware system, the first hardware system is connected to the shared device via the switcher, the first hardware system including:
      a first communication module for receiving the message; and a first user interaction module for generating an input interface for the second hardware system according to the message received from the second hardware system, the input interface to be used by the user to enter the information to be inputted required by the second hardware system, displaying the input interface on a display screen of the shared device, obtaining the information inputted by the user in the generated input interface, and sending the inputted information to the second hardware system via the first communication module,
   wherein when the first hardware system occupies the shared device via the switcher and the second hardware system is not connected to the shared device via the switcher, the second hardware system receiving the inputted information via the second communication module and the second control module processes the inputted information, and
   the second communication module sending the message to the first communication module via a direct data transmission path between the second communication module and the first communication module.

2. The multi-hardware-system data processing device according to claim 1, wherein:
   the second hardware system further comprises a second user interaction module for generating the input interface, and the message sent by the second communication module includes the input interface; and
   the first user interaction module comprises a display module for displaying the input interface on the display screen of the shared device.

3. The multi-hardware-system data processing device according to claim 1, wherein:
   the message includes request information for requesting the first hardware system to generate the input interface; and
   the first user interaction module comprises:
   a generating module for generating the input interface according to the request information; and
   a display module for displaying the input interface on the display screen of the shared device.

4. The multi-hardware-system data processing device according to claim 3, wherein:
   the message includes type information for the information to be inputted; the first hardware system further comprises a first control module for receiving the message from the first communication module, parsing the message, and confirming the type of the information to be inputted; and
   the first user interaction module prompts the user to input the information to be inputted of the corresponding type in the input interface according to the type of the information to be inputted.

5. The multi-hardware-system data processing device according to claim 3, wherein:
   the second control module further comprises:
   a determining module for, when the multi-hardware-system data processing device includes three or more than three hardware systems, determining a hardware system among the three or more than three hardware systems being connected to the shared device as the first hardware system by inquiring the connection state of each of the three or more than three hardware systems with the shared device; and
   an identifying module for adding a hardware system identification of the second hardware system into the message,
   wherein the first user interaction module prompts the user to input the information to be inputted of the corresponding hardware system in the input interface according to the hardware system identification included in the message.

6. An information input method of multi-hardware-system applied to a data processing device comprising a first hardware system, a second hardware system, a switcher and a shared device, one of the first hardware system and the second hardware system is switched to be connected to the shared device via the switcher, when the first hardware system occupies the shared device via the switcher and the second hardware system is not connected to the shared device via the switcher, the method comprising:
   sending a message to the first hardware system when the second hardware system requires a user to input the information to be inputted;
   the first hardware system generating an input interface for the second hardware system according to the message received from the second hardware system, the input interface to be used by the user to enter the information to be inputted required by the second hardware system, displaying the input interface on a display screen of the shared device, and the user inputting the information to be inputted by using the input interface;
   the first hardware system obtaining the information inputted by the user in the generated input interface, and sending the inputted information to the second hardware system; and
   the second hardware system receiving and processing the inputted information, wherein a second communication module of the second hardware system sending the message to a first communication module of the first hardware system via a direct data transmission path between the second communication module and the first communication module.

7. The information input method according to claim 6, wherein:
before the second hardware system sending a message to the first hardware system, the method further includes a step of
generating the input interface; and
including the input interface in the message sent by the second hardware system; and
the first hardware system obtaining an input interface according to the message comprises: the first hardware system displaying the input interface on the display screen of the shared device.

8. The information input method according to claim 6, wherein:
the message includes request information for requesting the first hardware system to generate the input interface; and
the first hardware system obtaining an input interface according to the message comprises: the first hardware system generating the input interface according to the request information and displaying the input interface on the display screen of the shared device.

9. The information input method according to claim 8, wherein:
the message includes type information of the information to be inputted; after the first hardware system receiving the message and before the first hardware system generating the input interface, the method further comprises steps of: parsing the message, and confirming the type of the information to be inputted; and
the first hardware system prompts the user to input the information to be inputted of the corresponding type in the input interface when generating the input interface.

10. The information input method according to claim 8, wherein:
when the multi-hardware-system data processing device includes three or more than three hardware systems, the second hardware system determines a hardware system among the three or more than three hardware systems being connected to the shared device via the switcher as the first hardware system by inquiring the connection state of each of the three or more than three hardware systems with the shared device;
the second hardware system adds a hardware system identification of the second hardware system into the message; and
the first hardware system prompts the user to input the information to be inputted of the corresponding hardware system in the input interface according to the hardware system identification indicated in the message when generating the input interface.

11. A multi-hardware-system data processing system including a first hardware system, a second hardware system, a switcher and a shared device, one of the first hardware system and the second hardware, system is switched to be connected to the shared device via the switcher, comprising:
the second hardware system including:
a second control module for generating a message when the second hardware system requires a user to input the information to be inputted, and
a second communication module for sending the message to the first hardware system;
the first hardware system is connected to the shared device via the switcher and comprises:
a first communication module for receiving the message, a first user interaction module for generating an input interface for the second hardware system according to the message received from the second hardware system, the input interface to be used by the user to enter the information to be inputted required by the second hardware system, obtaining the information inputted by the user in the input interface, and sending the inputted information to the second hardware system via the first communication module;
wherein when the first hardware system occupies the shared device via the switcher exclusively and the second hardware system is not connected to the shared device via the switcher, the second hardware system receives the inputted information via the second communication module and the second control module processes the inputted information,
wherein the second communication module sending the message to the first communication module via a direct data transmission path between the second communication module and the first communication module.

12. The multi-hardware-system data processing system according to claim 11, wherein:
the second hardware system further comprises a second user interaction module for generating the input interface;
the message sent by the second communication module includes the input interface; and
the first user interaction module includes a display module for displaying the input interface on the display screen of the shared device.

13. The multi-hardware-system data processing system according to claim 11, wherein:
the message includes request information for requesting the first hardware system to generate the input interface; and
the first user interaction module comprises:
a generating module for generating the input interface according to the request information; and
a display module for displaying the input interface on the display screen of the shared device.

14. The multi-hardware-system data processing system according to claim 13, wherein:
the message includes type information of the information to be inputted;
the first hardware system further comprises a first control module for receiving the message from the first communication module, parsing the message, and confirming the type of the information to be inputted; and
the first user interaction module prompts the user to input the information to be inputted of the corresponding type in the input interface according to the type of the information to be inputted.

15. The multi-hardware-system data processing system according to claim 13, wherein:
the second control module further comprises:
a determining module for, when the multi-hardware-system data processing device includes three or more than three hardware systems, determining a hardware system among the three or more than three hardware systems being connected to the shared device as the first hardware system by inquiring the connection state of each of the three or more than three hardware systems with the shared device; and
an identifying module for adding a hardware system identification of the second hardware system into the message,
wherein the first user interaction module prompts the user to input the information to be inputted of the corresponding hardware system in the input interface according to the hardware system identification included in the message.

* * * * *